United States Patent

Maeda et al.

[11] Patent Number: 6,004,616
[45] Date of Patent: Dec. 21, 1999

[54] BIODEGRADABLE VEGETABLE FILM

[75] Inventors: Hirokazu Maeda; Hitoshi Furuta, both of Kitasoma-gun; Chiemi Takei, Inashiki-gun; Toshiaki Saito, Sennan-gun; Hiroyuki Mori, Abiko; Kazunobu Tsumura, Kitasoma-gun, all of Japan

[73] Assignee: Fuji Oil Company, Ltd., Osaka, Japan

[21] Appl. No.: 08/714,957

[22] Filed: Sep. 17, 1996

Related U.S. Application Data

[62] Division of application No. 08/437,983, May 10, 1995, Pat. No. 5,587,197, which is a continuation-in-part of application No. 08/076,946, Jun. 16, 1993, abandoned, which is a continuation of application No. 07/768,412, filed as application No. PCT/JP91/00132, Feb. 5, 1991.

[30] Foreign Application Priority Data

Feb. 7, 1990 [JP] Japan .................................. 2-27882
Feb. 9, 1990 [JP] Japan .................................. 2-30677

[51] Int. Cl.⁶ ........................................... A23G 3/00
[52] U.S. Cl. .............. 426/658; 106/163.01; 106/164.01; 106/165.01; 127/36; 127/37
[58] Field of Search ................... 162/91, 99; 127/36, 127/37; 426/431, 481, 507, 656, 658, 634, 804, 138, 108; 106/163.01, 164.01, 165.01

[56] References Cited

U.S. PATENT DOCUMENTS

| | | | |
|---|---|---|---|
| 2,450,586 | 10/1948 | Dunning et al. | 127/37 |
| 2,868,778 | 1/1959 | Watson et al. | 127/37 |
| 2,881,076 | 4/1959 | Sair | 99/14 |
| 4,054,679 | 10/1977 | Melcer et al. | 426/656 |
| 4,239,906 | 12/1980 | Antrim et al. | 127/37 |
| 4,359,532 | 11/1982 | Brown | 127/37 |
| 4,927,654 | 5/1990 | Barnett et al. | 426/548 |
| 5,286,502 | 2/1994 | Meyers | 426/138 |

FOREIGN PATENT DOCUMENTS

| | | |
|---|---|---|
| 59-143554 | 8/1984 | Japan . |
| 64-62303 | 3/1989 | Japan . |
| 1-104144 | 4/1989 | Japan . |
| 2-303459 | 12/1990 | Japan . |

*Primary Examiner*—Peter Chin
*Attorney, Agent, or Firm*—Wenderoth, Lind & Ponack, L.L.P.

[57] ABSTRACT

There is disclosed a process for production of water-soluble vegetable fibers in a high yield with minimizing contamination of protein or amino acids resulting from degradation of protein by degrading water-insoluble vegetable fibers containing protein under acidic conditions of at about the isoelectric point of the protein and at a temperature of 130° C. or lower. Biodegradable films, paste, chewing gum and low calorie food products using the water-soluble vegetable fibers are also disclosed.

1 Claim, No Drawings

BIODEGRADABLE VEGETABLE FILM

This application is a division of application Ser. No. 08/437,983, filed May 10, 1995 (now U.S. Pat. No. 5,587, 197), which application is a continuation-in-part of now abandoned application Ser. No. 08/076,946, filed Jun. 16, 1993, which application is a continuation of now abandoned application Ser. No. 07/768,412, filed Oct. 7, 1991, which is a U.S. National Phase Application of PCT/JP91/00132 filed Feb. 5, 1991.

FIELD OF THE INVENTION

The present invention relates to a process for production of water-soluble vegetable fibers from water-insoluble vegetable fibers which are residues obtained by defatting oil seeds such as soybeans and the like, and extracting protein therefrom (e.g, "okara" and the like), or residues obtained by extracting starch from cereals. Further, the present invention relates to transparent biodegradable films, paste and chewing gum as well as low calorie food products using the water soluble vegetable fibers.

PRIOR ART

Residues obtained by extracting fats and oils from oil seeds and then extracting protein, or by extracting starch from cereals are rich in vegetable fibers. However, it is difficult to recover the vegetable fibers in good yield because remaining protein entangles with vegetable fibers. Further, because of water-insolubility of these vegetable fibers, it is difficult to obtain water-soluble vegetable fibers in good yield with minimizing contamination of protein by degrading these water-insoluble vegetable fibers. For example, a residue, "okara", which is obtained by extracting fats and oils as well as protein from soybeans and the like, are water-insoluble vegetable fibers still containing soybean protein. When the water-insoluble vegetable fibers are degraded with an alkali to extract water-soluble polysaccharides, the saccharides are degraded to oligosaccharides, or soybean protein, degraded soybean peptide and/or amino acids are contaminated. Thus, it is difficult to obtain highly purified vegetable fibers in a high yield.

At present, no process for recovering water-soluble vegetable fibers in high purity and high yield from such water-insoluble fibers has been found. If it were possible to obtain water-soluble vegetable fibers in high purity and high yield, such water-soluble vegetable fibers could be widely applied to various kinds of films and adhesives, food products and the like. For example, plastic package films are not naturally degraded. Although collagen films and pullulan films have biodegradable properties, i.e., capability for degradation by microorganisms, and the like, there are problems that collagen films have inferior heat-seal property, and pullulan films are expensive. On the other hand, it is possible to obtain the films without these problems by using the water-soluble vegetable fibers.

Further, adhesives such as animal glue, modified starch, gum arabic, pullulan, polyvinyl alcohol and the like, in particular, paste as remoistening adhesives have practical problems that their adhesive strength is low, they are expensive, and the like. However, such problems can be solved by using the water-soluble vegetable fibers.

Further, for example, when pullulan, which is water soluble polysaccharide produced by a microorganism, is used in chewing gum, pullulan is expensive in comparison with the water-soluble vegetable fibers, and the resulting chewing gum has inferior durability of pleasant chewing property and inferior water retention. However, when the water-soluble vegetable fibers is used, such problems can be solved.

Furthermore, the water-soluble vegetable fibers can be used for low calorie food products and such low calorie food products have not been known heretofore in the prior art.

OBJECTS OF THE INVENTION

The object of the present invention is to provide a process for production of water-soluble vegetable fibers from water-insoluble vegetable fibers containing protein, and is to provide films, paste, chewing gum and low calorie food products obtained by using the resulting water-soluble vegetable fibers.

DISCLOSURE OF THE INVENTION

The process for production of water-soluble vegetable fibers of the present invention comprises degrading water-insoluble vegetable fibers containing protein under acidic conditions of at about the isoelectric point of the protein and at a temperature of 130° C. or lower.

As the water-insoluble vegetable fibers containing protein, there can be used residues obtained by removing husks, fats and oils and protein from oil seeds (e.g., soybeans, palm, coconut, corn, cottonseed, corn, etc.), and residues obtained by removing grounds, starch and the like from cereals (e.g., rice, wheat, etc.).

In the process of the present invention, it is suitable to degrade the water-insoluble vegetable fibers by heating at about an isoelectric point (normally, acidic range) of protein which is contained in the water insoluble vegetable fibers. Thereby, in comparison with alkaline degradation, contamination of protein in a degraded fraction can be minimized and no post step for removing protein is required to obtain water soluble-vegetable fibers having lower protein contents and high purity. Further, formation of any harmful material such as lysinoalanine or the like can be prevented and this is preferred from the viewpoint of productivity.

The pH about the isoelectric point of the protein contained in the water-insoluble vegetable fibers is normally within an acidic range (not higher than pH 6). For example, in the case of a residue obtained by extracting fats and oils and protein from soy beans, i.e. "okara", pH 3 to 6 is preferable.

Further, when husks such as peels and the like are contained in the water-insoluble vegetable fibers, the taste and flavor of the water-soluble vegetable fibers obtained becomes inferior and, therefore, in the present invention, it is preferred to use water-insoluble vegetable fibers from which husks such as peels and the like are removed. When the water-insoluble vegetable fibers are obtained from oil seeds, green flavor and the like of the resulting water-soluble vegetable fibers can be reduced by using water-insoluble vegetable fibers from which husks and the like are removed. For example, in the case of "okara" containing soybean protein, it is preferred to use "okara" obtained from dehusked soybeans.

"Okara" to be used in the present invention is a residue obtained by adding water to defatted soybeans from which its oil fraction has been extracted and removed, forming a slurry which contains okara and a water-soluble fraction by mixing the resultant mixture, e.g., with stirring and removing the water-soluble fraction, e.g., with centrifugation.

When the water-soluble fraction is subjected to isoelectric precipitation, e.g., by addition of an acid, it can be fractionated into soybean protein and whey. Whey contains carbohydrates containing oligosaccharides and proteins such as soybean albumin and the like.

"Okara" contains water-insoluble fibers and soybean proteins which remain without extraction. Normally, "okara" contains about 40 to 65% by weight of edible fibers based on the dry solids thereof. Suitably, "okara" contains 10 to 40% by weight, preferably 10 to 20% by weight proteins based on the dry solids thereof.

In the present invention, the reason why the water-insoluble vegetable fibers containing protein are degraded under acidic conditions at about the isoelectric point of protein is that the vegetable fibers are excessively degraded under considerably stronger acidic conditions than those at the isoelectric point of protein, for example, in the case of the degradation of "okara" containing soybean protein as described above under strong acidic conditions of pH 2 or lower, which results in deterioration of functions as the vegetable fibers. Further, protein is also degraded together with the vegetable fibers and dissolved and, thereby, when the fibers are used for drinks and the like, clouding of liquid is caused by neutralization. Furthermore, sufficient neutralization is required because of low pH and, therefore, the amount of a salt formed by neutralization increases, which requires an additional desalting step.

On the other hand, when water-insoluble vegetable fibers containing protein are degraded at a considerably higher pH than the isoelectric point of protein such as under neutral or alkaline conditions, for example, when "okara" containing soybean protein as described above is degraded under alkali conditions, i.e., at a pH higher than 7, protein is degraded and dissolved together with the vegetable fibers and, therefore, clouding of liquid is caused, or browning tends to be caused by reaction of sugars with amino acids produced by degradation.

The reason why the water-insoluble vegetable fibers containing protein are degraded at a temperature of not higher than 130° C. is that, when a temperature rises to higher than 130° C., sugars produced by degradation (reducing sugars) react with amino acid to cause browning or an intense bad odor is caused. The temperature at which the water-insoluble vegetable fibers containing protein are degraded can be 130° C. or lower. In order to carry out the degradation efficiently, the temperature should be higher than room temperature, preferably 80° C. or higher, more preferably 100° C. or higher.

Preferably, the water-soluble vegetable fibers produced by fractionating water-insoluble vegetable fibers at a high temperature under acidic conditions are further treated with activated charcoal to remove hydrophobic materials and low molecular weight materials and, thereby, the purity of the water-soluble vegetable fibers can be further improved.

The water-soluble vegetable fibers thus obtained contain water-soluble hemicellulose, for example, the water-soluble soybean fibers obtained from the residue of soybeans, "okara", are composed of rhamnose, fucose, arabinose, xylose, galactose, glucose and uronic acid as the constituent saccharide component, and have an average molecular weight of from 50,000 to 1,000,000, preferably from 100,000 to 400,000.

In the present invention, the average molecular weight of saccharides is determined by measuring the viscosity in 0.1M sodium nitrate solution according to intrinsic viscosity using standard pullulan (manufactured by Hayashibara Seibutsu Kagaku Kenkyusho) as the standard substance. The proportion of saccharides are determined by the following analytical methods.

Uronic acid is determined by Blumen-Krantz method. Neutral saccharides are determined by alditol-acetate method.

The water-soluble vegetable fibers of the present invention thus obtained are superior in adhesive, film-forming properties, tensile properties of film, thickening properties (particularly, they have thickening properties within an alkaline range but, the viscosity is decreased under acidic conditions) and the like.

Hereinafter, transparent biodegradable films, paste, chewing gum and low calorie food prepared by using the water-soluble vegetable fibers of the present invention obtained from the water-insoluble vegetable fibers are illustrated.

The film of the present invention is a biodegradable film which has sufficient strength even in the form of a thin film, can be subjected to heat-sealing and is produced at a low production cost.

The biodegradable film can be prepared from the water-soluble vegetable fibers by using a known film forming method. For example, the water-soluble vegetable fibers can be extended on a plate or resin membrane in a suitable thickness and then they are dried to prepare the biodegradable film.

Further, in order to improve the properties of the biodegradable film, it is possible to add additives such as plasticizers, surfactants and the like. When such additives are used, it is preferred to select the additives so that they do not adversely affect the edibility of the above biodegradable film.

The paste of the present invention is an adhesive whose main component is the water-soluble vegetable fibers, particularly, the paste of the present invention is a remoistening adhesive.

When the protein content of the water-soluble vegetable fibers used is lower (normally, less than 10% by weight based on the dry solids), adhesion becomes stronger. Preferably, the protein content is not higher than 8% by weight, more preferably, not higher than 5% by weight.

The chewing gum of the present invention is that containing the water-soluble vegetable fibers.

In general, a chewing gum is composed of a gum base (normally, from 15 to 30% by weight), a sweetener (sugar, glucose, malt syrup and the like), and flavors and nutriments (normally, from 0.2 to 2% by weight). The gum base is composed of a natural resin, vinyl acetate resin, an ester gum, a synthetic gum, a natural wax, an emulsifying agent, calcium carbonate and the like.

Preferably, the content of the water-soluble vegetable fibers in the chewing gum of the present invention is from 1 to 40 parts by weight, preferably 2 to 30 parts by weight per 100 parts by weight of a gum base. In the case of a chewing gum such as flavored gum, bubble gum or the like, normally, the content of the water-soluble vegetable fibers of about from 0.2 to 10% by weight is preferred. In the case of a chewing gum containing less sweeteners, since as the content of saccharides is decreased, the amount of the water-soluble vegetable fibers is larger than this. When the content of the water-soluble vegetable fibers becomes too large, visco-elasticity is increased and the chewing gum becomes hard upon chewing. On the other hand, when the content becomes too small, the effect of the present invention is lost.

Since the dissolution rate in the mouth at a suitable content of the water-soluble vegetable fibers is slower than that of pullulan, superior durability of pleasant chewing properties and lasting of flavor can be obtained.

The low calorie food products of the present invention are food products composed of, as main raw materials, oils and fats and carbohydrate wherein a part of the raw materials is replaced with the water-soluble vegetable fibers to decrease the calories.

EXAMPLES

The following examples further illustrate the present invention in detail.

Example 1

Process for preparing water-soluble vegetable fibers

In this example, raw "okara" obtained during the production of isolated soybean protein from defatted soybeans was used as water-insoluble vegetable fibers containing protein. The raw "okara" contained about 80% by weight of water and its solids component contained about 65% by weight of vegetable fibers and about 20% by weight of crude protein. The isoelectric point of the protein was about pH 4.5.

After addition of twice the amount of water was added to this raw "okara", 36% hydrochloric acid was added to the mixture to adjust to pH 3 to 6. Then, the mixture was degraded by heating at a temperature of not higher than 130° C. In the "okara" thus degraded, the water-insoluble vegetable fibers were degraded into water-soluble vegetable fibers. On the other hand, most of protein contained in the raw "okara" remained in an aggregated state without degradation.

The resulting degraded material was centrifuged at 8,000 rpm for 30 minutes and the precipitated fraction containing the aggregated protein was removed to obtain a supernatant wherein water-soluble vegetable fibers were dissolved.

The supernatant contained a large amount of the water-soluble fibers obtained by degrading the water-insoluble fibers. On the other hand, the amount of protein which was degraded and dissolved was decreased and, therefore, browning of a solution and clouding of a liquid upon neutralization were not observed.

Then, experiments were carried out by varying the amount of addition of 36% hydrochloric acid or 50% sodium hydroxide to the mixture of raw "okara", which was diluted with the addition of twice the amount of water as described above, to change the pH of a mixture, or the temperature of heat degradation of a mixture whose pH was adjusted to produce water-soluble vegetable fibers. Products obtained under the conditions of the above example were compared with those outside of the conditions of the above example.

Experiments No. 1 to 11

In these experiments, samples in the range of pH 1 to 14 were prepared by, as shown in Table 1, appropriately varying the amount of addition of 36% hydrochloric acid or 50% sodium hydroxide to the mixture of raw "okara", which was diluted with the addition of twice the amount of water as described above.

After adjusting the pH, the mixture was degraded by heating at 120° C. for 1.5 hours, a precipitated fraction was removed by centrifugation as described above to obtain a supernatant.

If necessary, the resulting supernatant was neutralized and the color and flavor were evaluated. The results are shown in Table 1.

The evaluation of the color of the supernatant in Table 1 is expressed by the following criteria: "D" is dark brown to black, "C" is brown, "B" is pale brown, and "A" is colorless.

TABLE 1

| Experiment No. | pH | Evaluation of color | Evaluation of flavor |
| --- | --- | --- | --- |
| 1 | 1 | C | scorched and salty flavor |
| 2 | 2 | C | scorched and salty flavor |
| 3 | 3 | B | good, some salty flavor |
| 4 | 4 | A | good |
| 5 | 5 | A | good |
| 6 | 6 | A | good |
| 7 | 7 | B | good, but some strange flavor |
| 8 | 8 | B | strange flavor |
| 9 | 10 | B | strange and salty flavor |
| 10 | 12 | C | strange and salty flavor |
| 11 | 14 | C | strange and salty flavor |

With regard to Experiment No. 1 to 6, the yield of the water-soluble fraction in the supernatant, the protein content in the water-soluble fraction (% by weight), and the turbidity (OD 610 nm) of the aqueous solution wherein the content of the water-soluble fraction was adjusted to 4% by weight after neutralization were measured.

These results are shown in Table 2.

TABLE 2

| Experiment No. | Yield | Protein content | Turbidity |
| --- | --- | --- | --- |
| 1 | 78.5 | 20.5 | 2.729 |
| 2 | 77.8 | 16.0 | 1.396 |
| 3 | 76.2 | 10.5 | 0.085 |
| 4 | 72.9 | 6.2 | 0.068 |
| 5 | 62.8 | 5.2 | 0.090 |
| 6 | 61.7 | 7.2 | 0.161 |

Experiments No. 12 to 22

In these experiments, twice the amount of water was also added to raw "okara". In the same manner as that described in the above Experiment No. 1 to 11, the amount of addition of 36% hydrochloric acid or 50% sodium hydroxide was varied as shown in Table 3 to prepare samples in the range of pH 1 to 14.

Then, after the mixtures were degraded by heating at 130° C. for 1.5 hours, the precipitated fraction was removed by centrifugation as described above to obtain a supernatant.

If necessary, the resulting supernatant was neutralized and then the color and flavor were evaluated as described above. The results are shown in Table 3.

TABLE 3

| Experiment No. | pH | Evaluation of color | Evaluation of flavor |
| --- | --- | --- | --- |
| 12 | 1 | C | scorched and salty flavor |
| 13 | 2 | C | scorched and salty flavor |
| 14 | 3 | B | good, some salty flavor |
| 15 | 4 | A | good |
| 16 | 5 | A | good |
| 17 | 6 | A | good |
| 18 | 7 | B | good but some strange flavor |
| 19 | 8 | B | strange flavor |
| 20 | 10 | C | strange and salty flavor |
| 21 | 12 | C | strange and salty flavor |
| 22 | 14 | C | strange and salty flavor |

Experiments No. 23 to 44

In these experiments, twice the amount of water was also added to raw "okara". In the same manner as that described above, the amount of addition of 36% hydrochloric acid or 50% sodium hydroxide was varied to adjust the pH in the range of 1 to 14.

Then, in Experiments No. 23 to 33, the mixture was degraded by heating at 140° C. for 1.5 hours, and, in Experiments No. 34 to 44, the mixture was degraded by heating at 150° C. for 1.5 hours.

Then, the precipitated fraction was removed by centrifugation as described above to obtain a supernatant. If necessary, the supernatant was neutralized and the color and flavor were evaluated as described above. The results are shown in Tables 4 and 5.

TABLE 4

| Experiment No. | pH | Evaluation of color | Evaluation of flavor |
| --- | --- | --- | --- |
| 23 | 1 | D | scorched and salty flavor |
| 24 | 2 | D | scorched and salty flavor |
| 25 | 3 | C | scorched and some salty flavor |
| 26 | 4 | C | scorched flavor |
| 27 | 5 | B | scorched flavor |
| 28 | 6 | B | scorched flavor |
| 29 | 7 | C | scorched flavor |
| 30 | 8 | C | scorched flavor |
| 31 | 10 | C | scorched and salty flavor |
| 32 | 12 | D | scorched and salty flavor |
| 33 | 14 | D | scorched and salty flavor |

TABLE 5

| Experiment No. | pH | Evaluation of color | Evaluation of flavor |
| --- | --- | --- | --- |
| 34 | 1 | D | scorched and salty flavor |
| 35 | 2 | D | scorched and salty flavor |
| 36 | 3 | D | scorched and some salty flavor |
| 37 | 4 | D | scorched flavor |
| 38 | 5 | D | scorched flavor |
| 39 | 6 | D | scorched flavor |
| 40 | 7 | D | scorched flavor |
| 41 | 8 | D | scorched flavor |
| 42 | 10 | D | scorched and salty flavor |
| 43 | 12 | D | scorched and salty flavor |
| 44 | 14 | D | scorched and salty flavor |

As seen from the results in each experiment as shown above, the products of the experiments wherein the mixture of raw "okara" and twice the amount of water was adjusted to pH 3 to 6, and degraded by heating at a temperature of 130° C. or lower according to the conditions of the above example (Experiment No. 3 to 6 and 14 to 18) have a lower content of protein dissolved, a lower turbidity of the resulting liquid and lesser browning in comparison with the products of the other experiments carried out under the conditions outside of the above example. Further, the products of the former experiments have superior flavor.

Example 2

In this example, raw "okara" obtained during the production of isolated soybean protein from defatted soybeans was used as water-insoluble vegetable fibers. This raw "okara" contained 80% by weight of water and its solids component contained about 65% by weight of vegetable fibers and about 20% by weight of crude protein.

Water was added to the raw "okara" to adjust the dry solids content to about 5% by weight and the mixture was homogenized twice at 200 kg/cm$^2$ with a high pressure homogenizer ("Sub-Micron-dis-perser" manufactured by MANTON-GAULIN Co.).

Then, an equal amount of water was added to the homogenized mixture and the mixture was stirred. To the mixture was added a protease (strength: 240 pu/mg) derived from *Aspergillus oryzae* so that the E/S ratio became 1/100 to degrade protein in the raw "okara" at 50° C. for 3 hours. The strength of the protease was determined according to the Hagiwara-Anson method.

After degradation of protein, the mixture was centrifuged at 8,000 rpm for 30 minutes, the solubilized protein was removed and water was added to the remaining precipitated fraction to adjust the solids content to about 4% by weight. To the mixture was added 36% hydrochloric acid to adjust to pH 3 and degradation was carried out at 100° C. over 6 hours to degrade water-insoluble vegetable fibers to water-soluble vegetable fibers.

To the resulting degraded material was added 10% sodium hydroxide solution to neutralize to pH 7.0 and the mixture was centrifuged at 8,000 rpm for 30 minutes to obtain a water-soluble fraction containing a large amount of water-soluble vegetable fibers. After the water-soluble fraction was concentrated until the solids content became about 5% by weight, the residue was extended thinly on a synthetic resin film, dried to form a film and released from the synthetic resin film. The biodegradable film thus obtained increased in transparency and it was an almost transparent and strong film. Further, the film was dissolved entirely in water without dispersion and was heat-sealable.

Example 3

In this example, 99% ethanol was added a water-soluble fraction containing a large amount of water-soluble vegetable fibers obtained by centrifugation as described in above Example 2 so that an 80% ethanol solution was obtained to precipitate a high molecular weight fraction of the water-soluble vegetable fibers in the water soluble fraction.

After the precipitated high molecular weight fraction was dried in hot air, water was added to this so that a 20% aqueous solution was obtained. In the same manner as that described in the above Example 2, the solution was extended thinly on a synthetic resin film, dried to form a film, and released from the synthetic resin film.

The biodegradable film thus obtained was, as described in the above Example 2, an almost transparent and strong film and was dissolved entirely in water without dispersion. The film was heat-sealable and maintained transparency for a prolonged period.

Example 4

In this example, after twice the amount of water was added to the above raw "okara", 36% hydrochloric acid was added to the mixture to adjust to pH 2.5 and the mixture was degraded at 100° C. for 1.5 hours.

Then, the degraded material was treated by a homogenizer. By the treatment of the degraded material with a homogenizer in this way, a smooth paste was obtained.

After addition of glycerin and sorbitol (each 1.0%) to the degraded material in the form of a smooth paste as plasticizers, the paste was cast by a casting method so that the thickness at casting became 1.0 mm, and dried to obtain a biodegradable film having 0.1 mm in thickness.

The resulting biodegradable film was a transparent, strong and smooth film, and was heat-sealable.

Example 5

In this example, as described in the above Example 4, after twice the amount of water was added to raw "okara", 36% hydrochloric acid was added to adjust the pH. In this example, the pH was adjusted to 4.5, i.e., about the isoelectric point of soybean protein contained in the raw "okara", and the mixture was degraded at 120° C. for 1.5 hours. When the raw "okara" was degraded at pH 4.5, i.e., about the isoelectric point of soybean protein in this way, water-insoluble vegetable fibers in the raw "okara" were suitably degraded to form water-soluble vegetable fibers. On the other hand, soybean protein contained in the raw "okara" was aggregated to prevent dissolution of protein in an aqueous solution wherein the water-soluble vegetable fibers were dissolved. The resulting degraded material was centrifuged at 8,000 rpm for 30 minutes as described the above Example 2 to separate a water-soluble fraction containing a large amount of water-soluble vegetable fibers and this fraction was concentrated until the solids content became about 5% by weight.

Then, according to the same manner as that described in the above Example 4, a film was formed from the concentrate.

The biodegradable film thus obtained was transparent and had a low protein content. It was heat-sealable.

Example 6

Production Process

Twice the amount (by weight) of water was added to the raw "okara" obtained during the production of isolated soybean protein and the pH was adjusted to 4.5 with hydrochloric acid. The mixture was degraded at 120° C. for 1.5 hours, cooled, and centrifuged (10,000 g for 30 minutes) to separate a supernatant and precipitate part. The precipitate part was washed with an equal weight of water, and centrifuged to obtain a supernatant. The latter supernatant was combined with the above supernatant and the mixture was subjected to an activated charcoal column treatment. The resulting liquid was dried to obtain water soluble-vegetable fibers (A).

Further, the water-soluble vegetable fibers were dissolved in 0.5% saline solution and reprecipitation was repeated three times so that the ethanol concentration became 50%. The mixture was desalted by using an ion exchange resin ("Amberlite IR-120B", manufactured by Organo) to obtain water-soluble vegetable fibers (B).

On the other hand, in the same manner, water-soluble vegetable fibers (C) were obtained except that the activated charcoal column treatment was omitted.

The results are shown in Table 6.

TABLE 6

| Component | Composition (%) | | |
|---|---|---|---|
| | A | B | C |
| Water | 5.71 | 7.75 | 5.10 |
| Crude protein | 1.93 | 1.03 | 5.43 |
| Crude ash content | 5.29 | 0.22 | 5.30 |
| Polysaccharides | 37.07 | 91.00 | 84.17 |
| Average molecular weight | 178,000 | 207,000 | 114,000 |

Pigment component, hydrophobic component and low molecular weight component were removed by the activated charcoal treatment.

The water soluble vegetable fibers of (A), (B) and (C) were analyzed for the saccharide composition. Uronic acid was measured by Blumen-Krantz method, and neutral saccharide was measured alditol-acetate method.

The results are shown in Table 7.

TABLE 7

| | Saccharide Composition (% by weight) | | |
|---|---|---|---|
| Kind of saccharides | A | B | C |
| Uronic acid | 20.4 | 16.9 | 19.4 |
| Rhamnose | 1.6 | 2.7 | 2.1 |
| Fucose | 2.7 | 5.2 | 3.9 |
| Arabinose | 19.9 | 19.2 | 23.1 |
| Xylose | 6.4 | 8.4 | 5.8 |
| Galactose | 47.3 | 40.8 | 43.4 |
| Glucose | 1.8 | 0.9 | 2.3 |

The water-soluble vegetable fibers were tested for adhesion strength by using a "zelkova tree (water content: 8.1%, specific gravity: 0.53 g/cm$^2$)" according to JIS K6848-1987 and K6851-1976. Namely, the water-soluble vegetable fibers were dissolved in water to obtain a 20% solution, which was applied to a piece of a zelkova tree in an amount of 100 g/m$^2$ and bonded to another piece of a zelkova tree without heat pressing. After drying at 20° C. for 48 hours under RH of 60%, the tensile shear strength was measured.

The results are shown in Table 8.

TABLE 8

| Tensile Shear Strength | |
|---|---|
| | Adhesion strength (kgf/cm$^2$) |
| A | 56.4 |
| B | 85.0 |
| C | 44.1 |
| Pullulan*[1] | 40.5 |
| Gum arabic*[2] | 30.7 |

*[1]pullulan: "PF-20" manufactured by Hayashibara Seibutsu Kagaku Kenkyusho.
*[2]"Gum arabic" manufactured by Kishida Kagaku.

It was found that the tensile strength of the water-soluble vegetable fibers obtained in Example 6 was strong.

Further, it was found that, when the purity of water-soluble vegetable fibers was higher, the tensile shear strength became stronger.

Example 7

The water-soluble vegetable fibers obtained in the same manner as that described in Example 6, fibers (A), were mixed with dextrin (manufactured by Sigma Co.) in the proportion shown in Table 9, and the adhesion strength was measured as described in Example 6. The results are shown in Table 9.

TABLE 9

| Adhesion strength (kgf/cm$^2$) | | |
|---|---|---|
| Dextrin | (A) | Adhesion Strength |
| 100 | 0 | 19.6 |
| 80 | 20 | 36.2 |
| 50 | 50 | 50.0 |
| 20 | 80 | 54.2 |
| 0 | 100 | 58.2 |

It is possible to increase or control the adhesion strength of dextrin by using a paste such as dextrin or the like together with the water-soluble vegetable fibers.

Example 8

To 300 g of a commercially available vegetable fibers ("SELPHA" manufactured by Nippon Shokuhin Kakou, fibers obtained by removal of starch, protein, lipid and the like from hull of corn) was added 2700 liters of water and the mixture was autoclaved (120° C. for 60 minutes) to degrade the fibers by heating. The degraded material was centrifuged (5,000 g for 10 minutes) to obtain a supernatant, to which ethanol was added so that the ethanol concentration became 60%. The operation for recovering the precipitate fraction was repeated once and the combined fration was dried to obtain 111 g of water-soluble vegetable fibers. The fibers were analyzed as described above. The results are shown in Table 10.

TABLE 10

| Moisture content | 8.70% |
|---|---|
| Crude protein | 0.36% |
| Crude ash content | 1.12% |
| Polysaccharides | 89.82% |

The polysaccharide composition was analyzed as described above. The results are shown in Table 11.

TABLE 11

| Uronic acid | 4.9% |
|---|---|
| Ara | 35.9% |
| Xyl | 45.7% |
| Gal | 6.1% |
| Glc | 7.4% |

The average molecular weight and adhesion strength determined as described above were 178,000 and 31.9 kgf/cm$^2$, respectively.

Example 9

When 5 parts by weight of water-soluble vegetable fibers obtained as described in Example 6, fibers (A), were added to water-glass having 70% moisture content, the adhesion speed was about twice faster than that of water-glass alone.

Example 10

Vinyl acetate resin (340 parts by weight), natural chicle (330 parts by weight) and polyisobutylene (200 parts by weight) were placed in a kneader and the mixture was melt-kneaded at 120° C. Then, glycerin aliphatic acid ester (30 parts by weight) was added and the mixture was further kneaded. Talc (powder, 100 parts by weight) was added and the mixture was kneaded to obtain a gum base.

Then, to the chewing gum kneader maintained at 60° C. was added a mixture of the above gum base (25 parts by weight), the water-soluble vegetable fibers (5 parts by weight) obtained as described in Example 6, fibers (A), water (5 parts by weight) and instant coffee (1 part by weight) and the mixture was kneaded. Then, powdered sugar (55 parts by weight), glucose (8 parts by weight) and flavor (1 part by weight) were added and the mixture was kneaded.

A sheet of chewing gum 5 cm in thickness was extruded with an extruder and rolled to 2 cm in thickness with a calendered roller.

Example 11

In the same manner as that described in Example 10, a chewing gum was obtained except that the water-soluble soybean vegetable fibers obtained as described in Example 6 (C) was used instead of the water-soluble soybean vegetable fibers (A).

Example 12

In the same manner as that described in Example 10, a chewing gum was obtained except that the water-soluble soybean vegetable fibers derived from hull of corn as described in Example 8 was used instead of the water soluble-soybean vegetable fibers (A).

Comparative Example 1

In the same manner as that described in Example 10, a chewing gum was obtained except that malt syrup (6.7 parts by weight) and water (3.3 parts by weight) were used instead of the water-soluble soybean vegetable fibers (A).

Comparative Example 2

In the same manner as that described in Example 10, a chewing gum was obtained except that pullulan (manufactured by Hayashibara Seibutsu Kagaku Kenkyusho) was used instead of the water-soluble soybean vegetable fibers (A).

Comparative Example 3

In the same manner as that described in Example 10, a chewing gum was obtained except that gum arabic (manufactured Kishida Kagaku) was used instead of the water-soluble soybean vegetable fibers (A).

Experiment 1

The chewing gums obtained in the above examples and comparative examples were evaluated organoleptically by 30 panelists after storing at 20° C. under relative humidity (RH) 40% for 1 week.

The results are shown in Table 12

TABLE 12

| Sample | Hardness at initial chewing | Lasting of taste | flavor |
|---|---|---|---|
| Example 10 | 8.0 | 8.1 | 8.2 |
| Example 11 | 8.1 | 8.0 | 7.2 |
| Example 12 | 7.6 | 7.0 | 7.4 |
| Comparative Example 1 | 8.0 | 6.4 | 7.8 |
| Comparative Example 2 | 7.0 | 6.2 | 7.1 |
| Comparative Example 3 | 6.8 | 6.3 | 6.4 |

The evaluation was carried out by scoring.

Score 10 represents the best properties and the larger score shows better properties. As seen from this experiment, it has been found that the chewing gum using the water-soluble vegetable fibers was soft at initial chewing, and has good lasting of taste.

Experiment 2

The chewing gums obtained in the above examples and comparative examples were tested for the increase in water content after storing at 40° C. under relative humidity (RH) 80% for 1 week.

The increase in water content was calculated from the following formula.

Increase in water content (Δ%)=Water content after storing (%)−Initial water content (%)

The results are shown in Table 13.

TABLE 13

| Sample | Increased in water content (Δ %) |
|---|---|
| Example 10 | 1.0 |
| Example 11 | 1.2 |
| Example 12 | 2.1 |
| Comparative Example 1 | 3.4 |
| Comparative Example 2 | 1.9 |
| Comparative Example 3 | 2.0 |

As seen from this examination, the chewing gum using the water-soluble hemicellulose has good properties with less hygroscopicity in spite of being soft at initial chewing.

Example 13
Low Calorie Chocolate

According to the oxygen weight method (Prosky method), TDF (total dietary fiber) of the water-soluble soybean vegetable fibers (A) was measured. It was 70.6%. Namely, the water-soluble fibers were low in calories. Then, according to a conventional method, chocolate of the following formulation was produced by using the low calorie water-soluble fibers.

| | Formulation (% by weight) | |
|---|---|---|
| Raw material | Present invention | Control |
| Cacao mass | 8.0 | 8.0 |
| Cocoa butter | 7.0 | 7.0 |
| Lactose | 0 | 7.0 |
| Water-soluble fibers | 10.0 | 0 |
| Powdered sugar | 47.0 | 50.0 |
| Cocoa butter | 28.0 | 28.0 |
| Lecithin | 0.3 | 0.3 |

When the chocolate of the present invention was evaluated organoleptically, no substantial difference from the control chocolate was found.

Example 14
Low Calorie Cookie

By using the water-soluble soybean vegetable fibers (A) obtained as described in Example 6, cookies were prepared with the following formulation according to a conventional method.

| | Formulation (% by weight) | |
|---|---|---|
| Raw material | Present invention | Control |
| Margarine | 26.1 | 26.1 |
| White sugar | 15.7 | 15.7 |
| Whole egg | 5.2 | 5.2 |
| Salt | 0.26 | 0.26 |
| Sodium bicarbonate | 0.26 | 0.26 |
| Ammonium carbonate | 0.32 | 0.32 |
| Low gluten content flour | 39.1 | 52.2 |
| Water-soluble fiber | 13.1 | 0 |

When the cookie of the present invention was evaluated organoleptically, no substantial difference from the control product was found.

EFFECT OF THE INVENTION

As described hereinabove, according to the present invention, it becomes possible to prepare water-soluble vegetable fibers from water-insoluble vegetable fibers in a high yield.

It also becomes possible to obtain a transparent biodegradable film having high tensile strength and low impurity by using the water-soluble vegetable fibers thus obtained.

Further, it becomes possible to obtain a paste, particularly, a remoistening adhesive having strong adhesion strength. In the paste of the present invention, adhesion strength can be further improved by esterification or etherification and water resistance can be provided by crosslinking or using together with a crosslinking agent. Furthermore, the paste of the present invention can be used together with another adhesive to increase adhesion strength or improve adhesion depending upon the particular kind of adhesives.

Furthermore, it becomes possible to obtain chewing gums having superior properties such as lasting of of pleasant chewing properties and lasting of flavor. Namely, it becomes possible to obtain chewing gums, candies, soft chewing gums, chewing gum confectionery, bubble gums and the like containing water-soluble hemicellulose.

In addition, it becomes possible to obtain low calorie food products by replacing a part of the protein and carbohydrates with the water-soluble vegetable fibers of the present invention.

What is claimed is:

1. A biodegradable film obtained by subjecting to film formation water-soluble hemicellulose having an average molecular weight of 50,000 to 1,000,000 which is obtained by degrading okara under acidic conditions at about the isoelectric condition of protein contained therein and at a temperature of 80 to 130° C.

* * * * *